United States Patent
Tremblay, Jr. et al.

(10) Patent No.: US 8,132,741 B2
(45) Date of Patent: Mar. 13, 2012

(54) SPRAYING APPARATUS AND METHOD FOR USING SAME

(75) Inventors: Thomas N. Tremblay, Jr., Miami, FL (US); Thomas N. Tremblay, Sr., Dunedin, FL (US); William A. Myers, Tampa, FL (US)

(73) Assignee: Florida Turf Support, Inc., Tampa, FL (US)

( * ) Notice: Subject to any disclaimer, the term of this patent is extended or adjusted under 35 U.S.C. 154(b) by 0 days.

(21) Appl. No.: 12/349,939

(22) Filed: Jan. 7, 2009

(65) Prior Publication Data

US 2010/0170962 A1 Jul. 8, 2010

(51) Int. Cl.
*B05B 1/28* (2006.01)
*B05B 1/20* (2006.01)
*B05B 15/04* (2006.01)
*B05B 9/00* (2006.01)
*B05B 1/16* (2006.01)
*A01C 23/00* (2006.01)

(52) U.S. Cl. ........ 239/166; 239/127; 239/142; 239/170; 239/172; 239/288.5

(58) Field of Classification Search .............. 239/67, 239/124, 127, 142, 146, 150, 159–168, 170, 239/172, 288, 288.3, 288.5
See application file for complete search history.

(56) References Cited

U.S. PATENT DOCUMENTS

| | | | | |
|---|---|---|---|---|
| 3,063,644 A | | 11/1962 | Bais | 239/77 |
| 3,666,178 A | * | 5/1972 | Crimmins et al. | 239/77 |
| 4,186,879 A | * | 2/1980 | Kinder | 239/172 |
| 4,225,084 A | * | 9/1980 | Bals | 239/223 |
| 4,274,589 A | * | 6/1981 | Jones | 239/167 |
| 4,353,505 A | * | 10/1982 | Kinder | 239/167 |
| 4,646,971 A | | 3/1987 | Rogers | 239/166 |
| 4,697,739 A | * | 10/1987 | McCracken et al. | 239/127 |
| 5,310,116 A | * | 5/1994 | Broyhill | 239/172 |
| D523,447 S | | 6/2006 | Dixon | D15/13 |
| 2006/0273189 A1 | * | 12/2006 | Grimm et al. | 239/146 |

FOREIGN PATENT DOCUMENTS

CA 1225374 8/1987
(Continued)

OTHER PUBLICATIONS

Anonymous, "Application Rates for the Enviromist CDA Spray System Spraydome 2250-Centre Section Only," Enviromist Industries Pty. Ltd, 11 pages.

(Continued)

*Primary Examiner* — Darren W Gorman
(74) *Attorney, Agent, or Firm* — Uradnik Law Firm PC

(57) ABSTRACT

Systems and methods for applying substances to target areas are disclosed. The system includes a hood supported by a frame and moveable relative thereto between open and closed positions, and one or more spray heads coupled to the underside of the hood and configured to spray the target area when the hood is in the closed position, the spray heads and the hood configured such that the hood provides a wind barrier for the spray from the spray heads. The system further includes a liquid tank for holding the substance to be applied to the target area, an agitation system for desired mixing of the tank contents, and fluid pathways for delivery of the contents of the tank to the spray heads for application to the target area.

30 Claims, 15 Drawing Sheets

FOREIGN PATENT DOCUMENTS

GB          2157935          11/1985

OTHER PUBLICATIONS

Figure 1A:
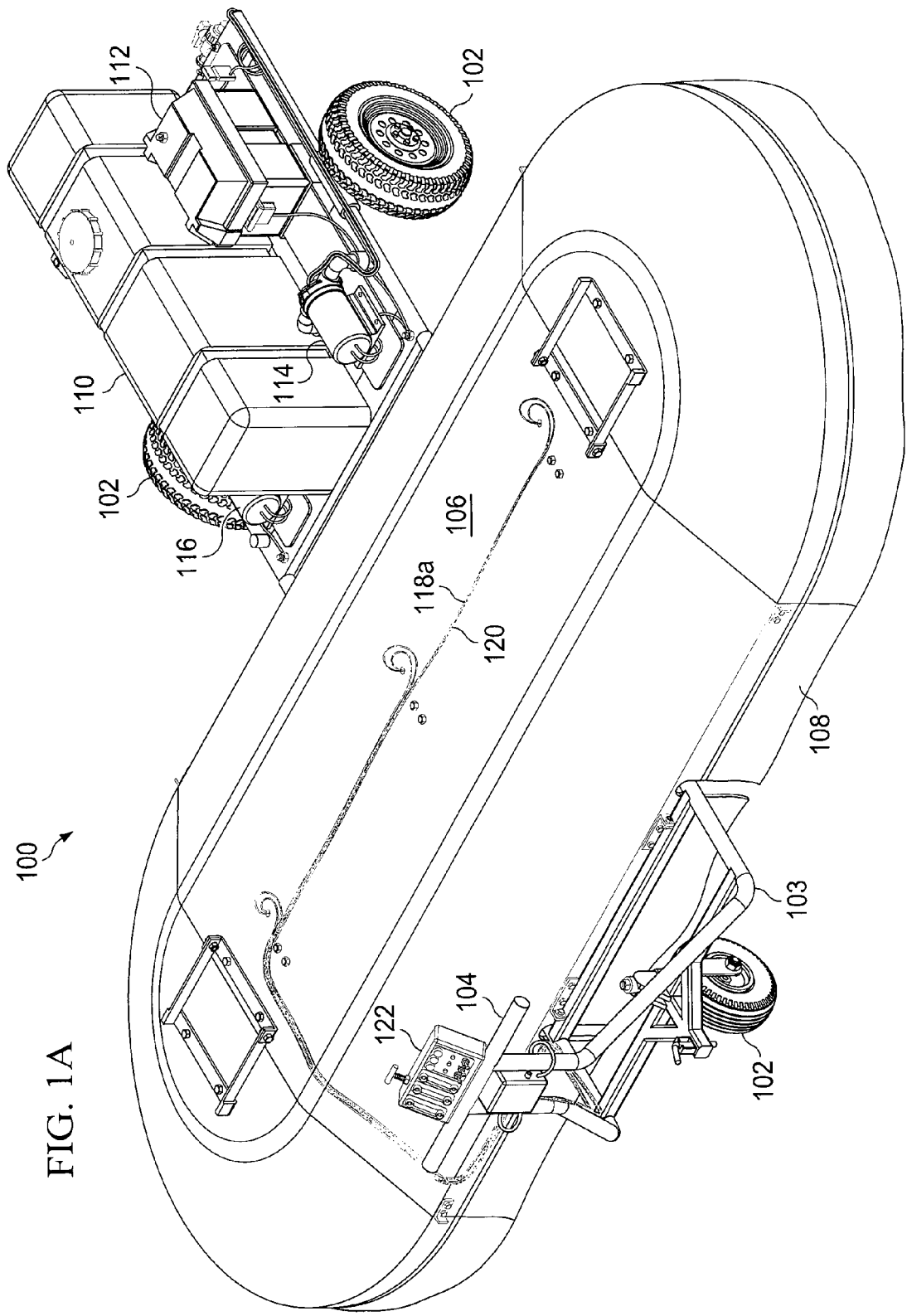

Anonymous, "Application Rates for the Enviromist CDA Spray System Spraydome 5000," Enviromist Industries Pty. Ltd, 6 pages.

Anonymous, "Application Rates for the Enviromist CDA Spray System Hummingbird/2250," Enviromist Industries Pty. Ltd, 1 page.

Anonymous, "Chemical usage chart in AUSTRALIA," Enviromist Industries Pty. Ltd, 1 page.

Anonymous, "History of Chemical usage in Turf-AUSTRALIA," Enviromist Industries Pty. Ltd, 1 page.

Anonymous, "USA TURF APPLICATIONS USED," Enviromist Industries Pty. Ltd, 1 page.

Anonymous, "Influence of droplet size on potential distance of drift," Enviromist Industries Pty. Ltd, 1 page.

Anonymous, Five Photographs of Enviromist Sprayer (San Diego, CA), Florida Turf Support, 5 pages. Aug. 16, 2005.

Anonymous, "Hummingbird Greens Sprayer Operating Manual", Enviromist Industries Pty. Ltd, 20 pages.

Anonymous, "Enviromist Hummingbird Greens Sprayer Operating Manual", Enviromist Industries Pty. Ltd, 8 pages.

Anonymous, "Enviromist Turf Products For effective, efficient, controlled spraying," Florida Turf Support and Enviromist Industries Pty. Ltd, 1 page.

Anonymous, "Enviromist Hummingbird Greens Sprayer Operating Manual", Enviromist Industries Pty. Ltd, 19 pages.

Anonymous, Photo of Enviromist Sprayer, Florida Turf Support, 1 page.

Anonymous, Picture of Enviromist Sprayer (Spraydome 5000), Enviromist Industries Pty. Ltd, 1 page.

Anonymous, "Enviromist Spraydome 2250 Operating Manual", Enviromist Industries Pty. Ltd, 1 page.

Anonymous, "Enviromist Turf Products Seven experts have their say!," Enviromist Industries Pty. Ltd, 4 pages.

Falcon sprayer manual, 28 pages. Sep. 25, 2006.

Falcon sprayer brochure, 2 pages.

Windfoil sprayer manual, 31 pages. Sep. 25, 2006.

Windfiol sprayer brochure, 2 pages.

Anonymous, "Enviromist Spraydome 5000 Operating Manual", Enviromist Industries Pty. Ltd., 12 pages.

\* cited by examiner

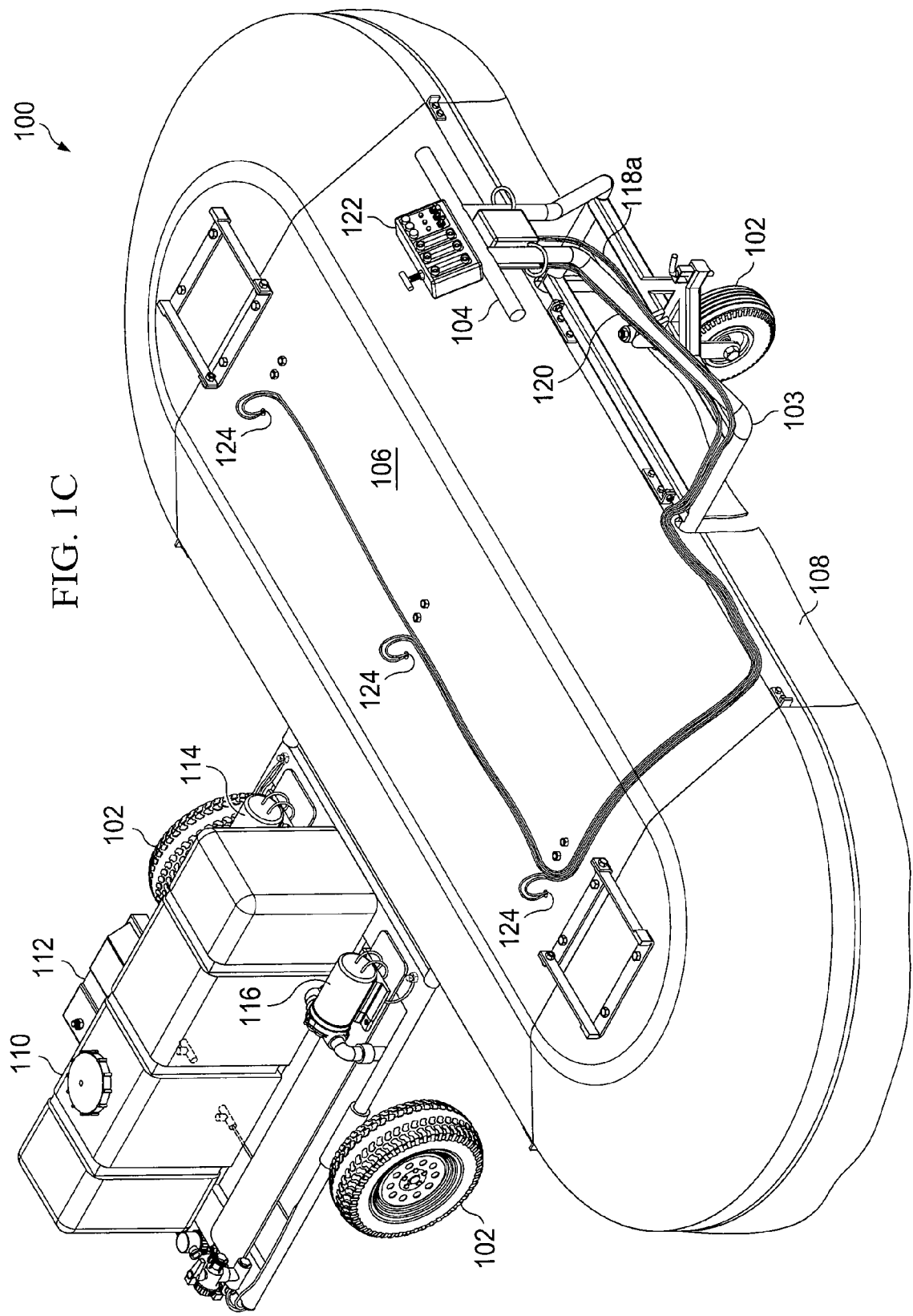

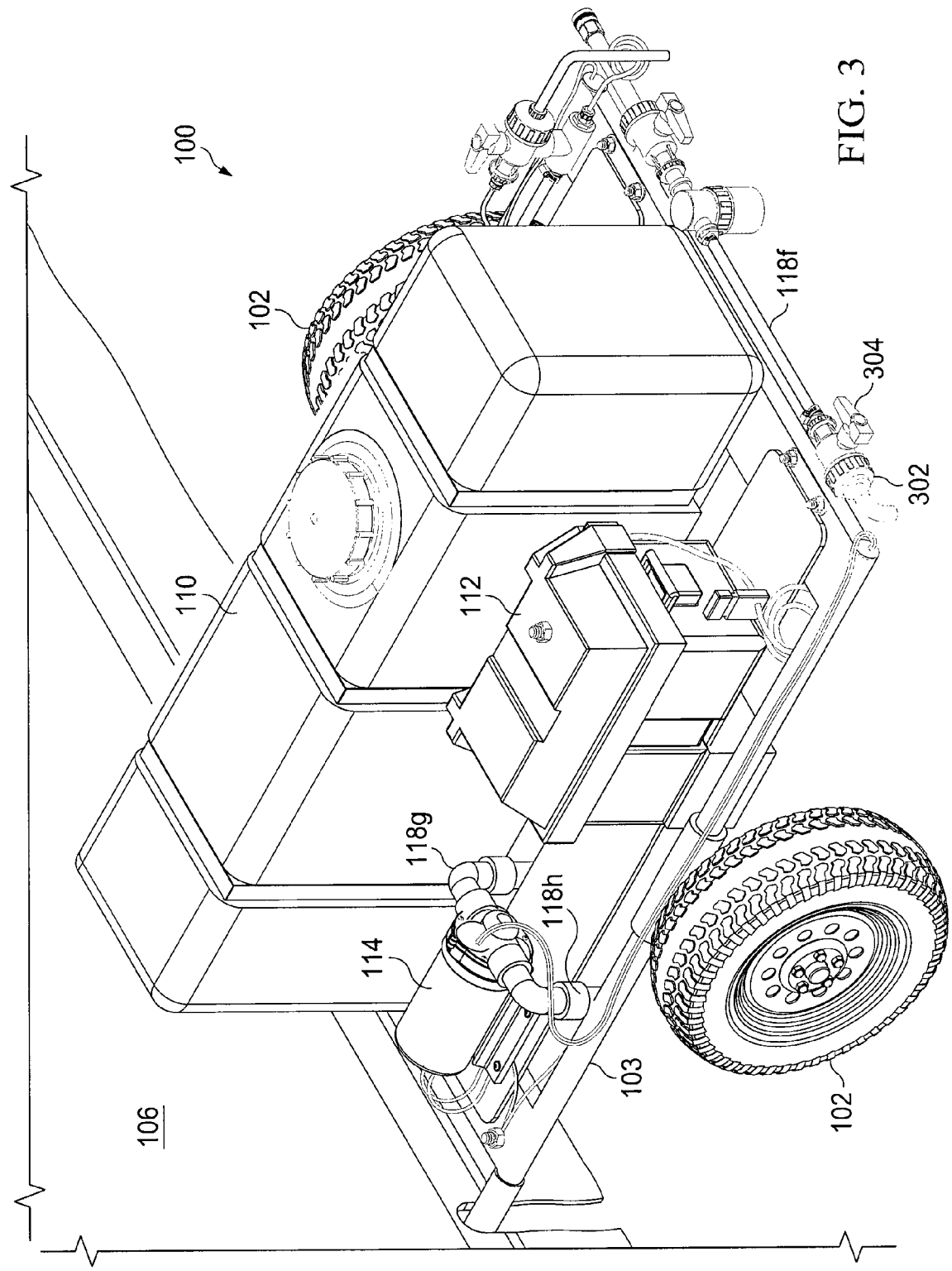

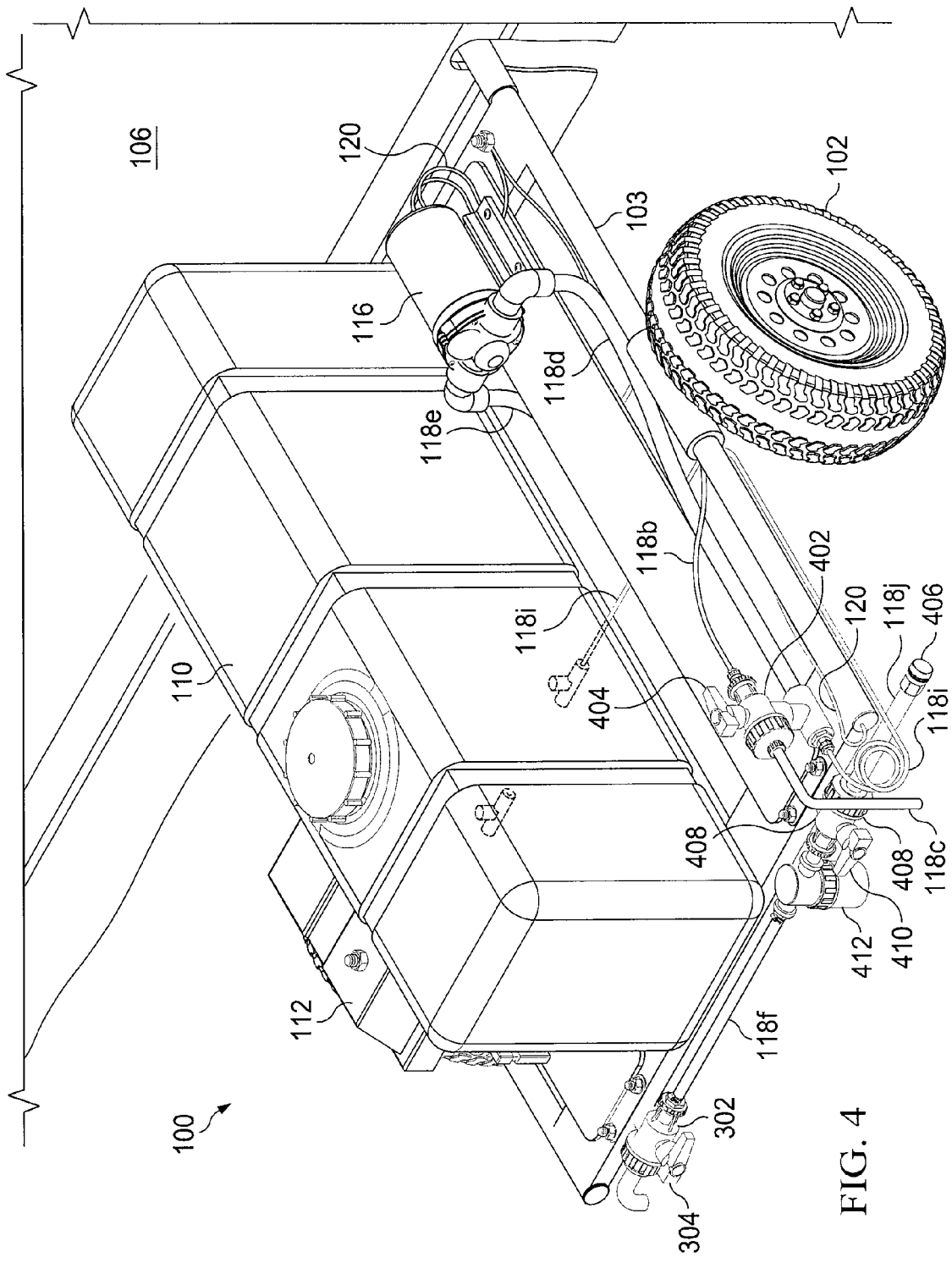

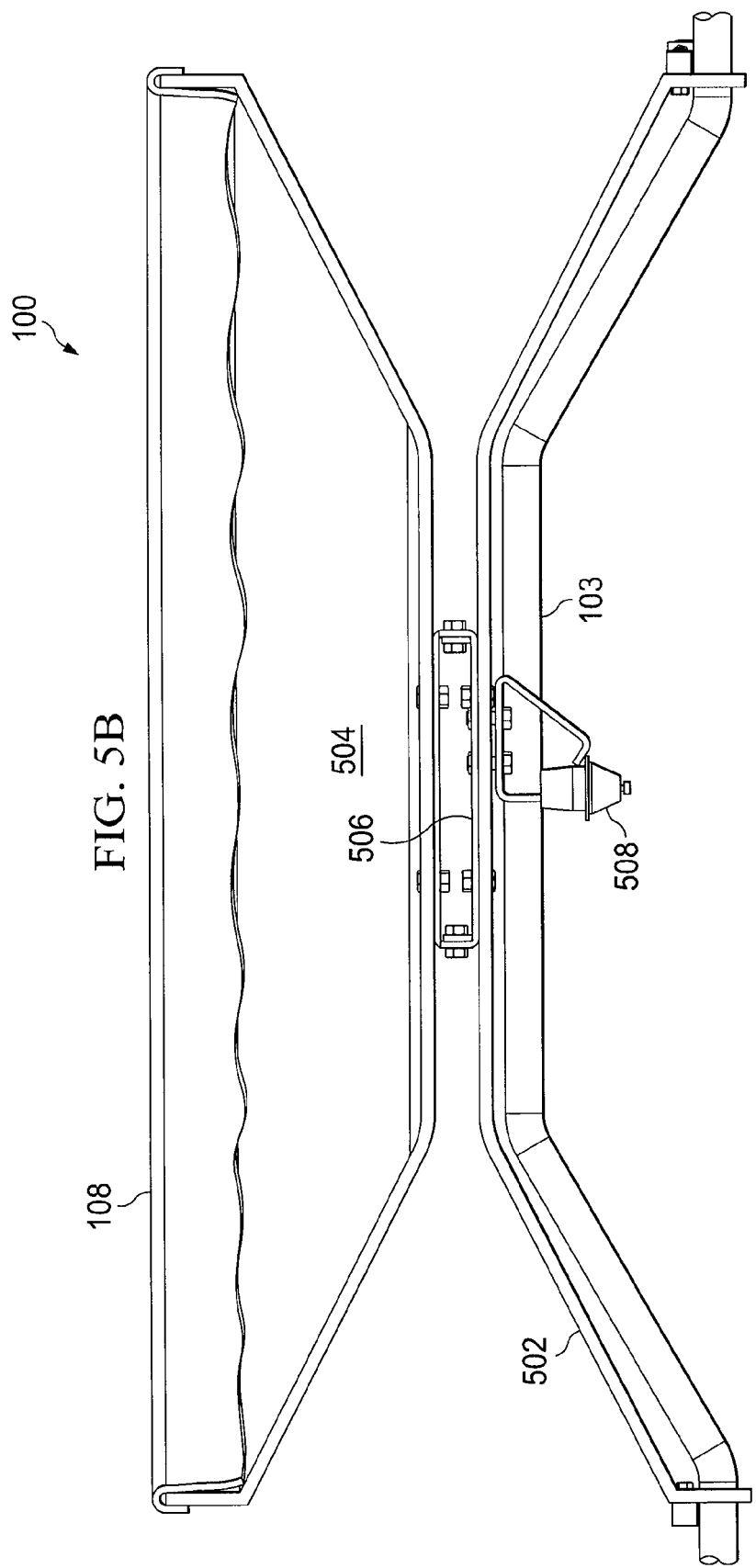

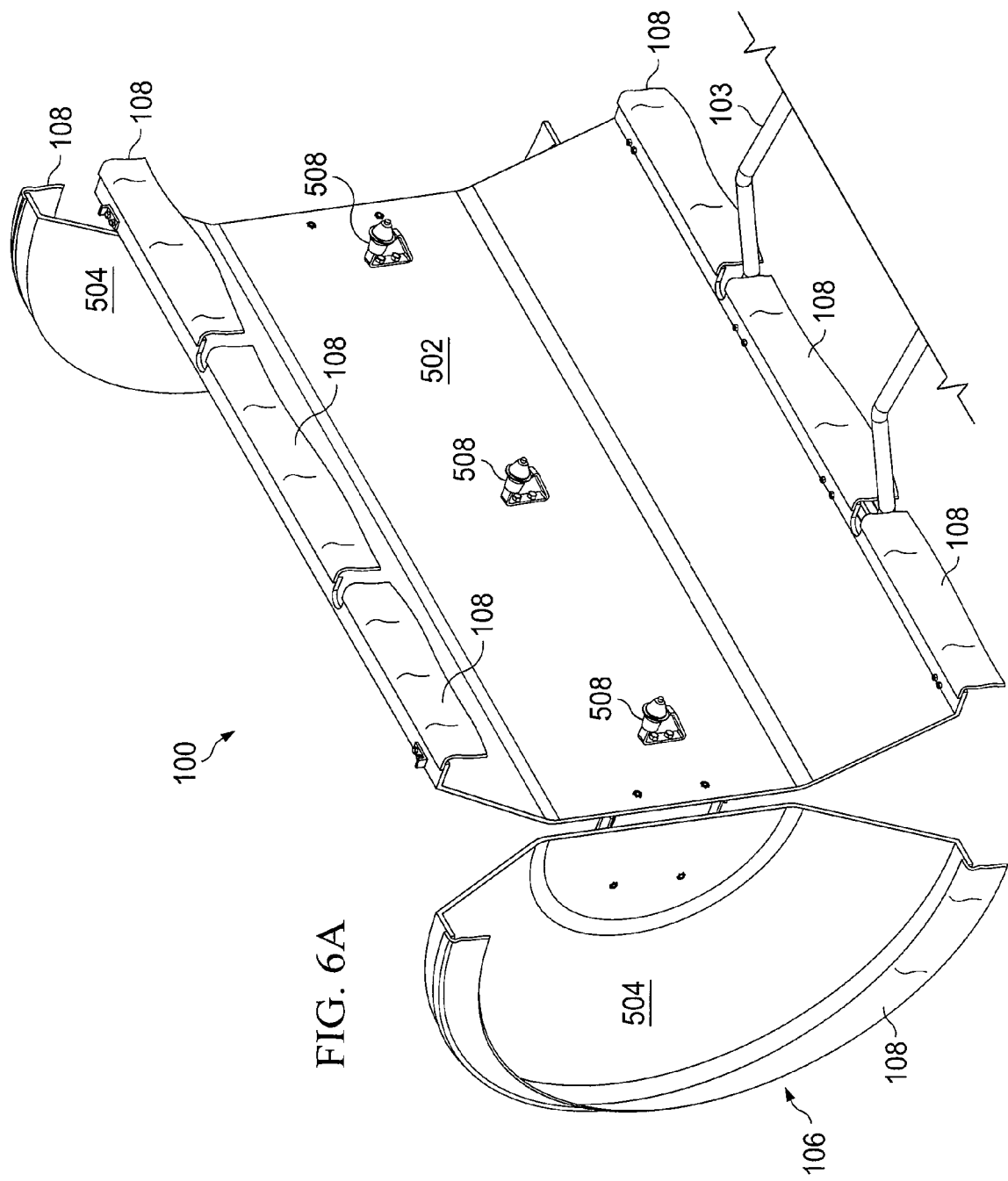

SPRAYING APPARATUS AND METHOD FOR USING SAME

TECHNICAL FIELD

The present disclosure relates in general to applying a substance to a target area, for example an area of land, and more particularly to an apparatus and method for spraying a liquid onto grass, turf, or other vegetated areas.

BACKGROUND

Liquid sprayers have long been used to apply liquid to crops, agricultural land, and recreational land for a variety of reasons. For example, pesticides (e.g., herbicides, insecticides, fungicides, and other biocides) are often applied to reduce or eliminate unwanted biological pests from agricultural and recreational land. Similarly, fertilizers, biostimulants, plant growth regulators, and other nutritional products may also be applied by a liquid sprayer to promote growth of desired plant life. Turf paint or dyes may also be applied by a liquid sprayer in order to provide a desired look or aesthetic to a surface.

A common method of applying liquid is by use of a control droplet applicator (CDA), also known as a rotary atomizer. Examples of CDAs for use in a variety of applications may be found in U.S. Pat. Nos. 3,063,644 and 4,225,084, each issued to Edward J. Bals. A CDA generally includes a disc and/or cone with miniaturized teeth at the outer perimeter of the disc and/or cone. In operation, the disc and/or cone rotates and is supplied a fluid to be sprayed. Under the centrifugal force of the rotating disc and/or cone, the fluid migrates towards the periphery of the disc and/or cone and towards the miniaturized teeth. The fluid then comes into contact with the miniaturized teeth and the fluid is sheared into many small droplets. The creation of multiple small droplets may allow efficient application of chemicals to plants (e.g., decreased chemical usage, decreased chemical runoff, and better coverage than traditional pressure-based liquid sprayers). In many applications, CDAs are designed to create droplets of a substantially uniform diameter and/or to apply the droplets in a substantially uniform manner upon the target plant and/or area.

To spray large areas, vehicles have been configured to carry or otherwise convey one or more CDAs to be used according to their desired application. For example, U.S. Design Pat. No. D523,447 sets forth a sprayer assembly for use in applying chemicals over a large area, for example onto golf course fairways and driving ranges or athletic fields.

However, traditional vehicles and apparatuses are not suitable for many applications. For example, residential yards and landscapes may be sensitive to traditional machinery, which often is heavy due to its construction and the incorporated weight of the liquid to be applied. As another example, the soil and grass making up golf greens often is meticulously landscaped to provide a suitable putting surface for golfers. Accordingly, performance of golf greens may suffer tremendously from compaction caused by traditional heavy spraying equipment.

In prior attempts to overcome this limitation, a spraying system including a boom apparatus is often used. In such a system, a spray boom is coupled by a hose to a traditional vehicle holding the liquid to be sprayed. While this arrangement reduces system weight at the point of spraying, such a boom apparatus is often cumbersome and expensive to use. The system often requires additional labor, i.e., multiple persons to walk the spray boom across the green to apply the desired chemical without damage to the green. Moreover, it applies products at traditional higher volumes. unlike the CDA technology. Other approaches to applying chemicals to a green using CDAs or other spray heads have also been too heavy or have proven difficult to operate or maneuver efficiently.

Accordingly, a need has arisen for a lightweight, easily maneuverable apparatus that permits uniform application of liquids using CDAs and other spray heads.

SUMMARY

In accordance with the teachings of the present disclosure, disadvantages and problems associated with traditional approaches to applying liquids to target areas have been substantially reduced or eliminated.

Figure 8:
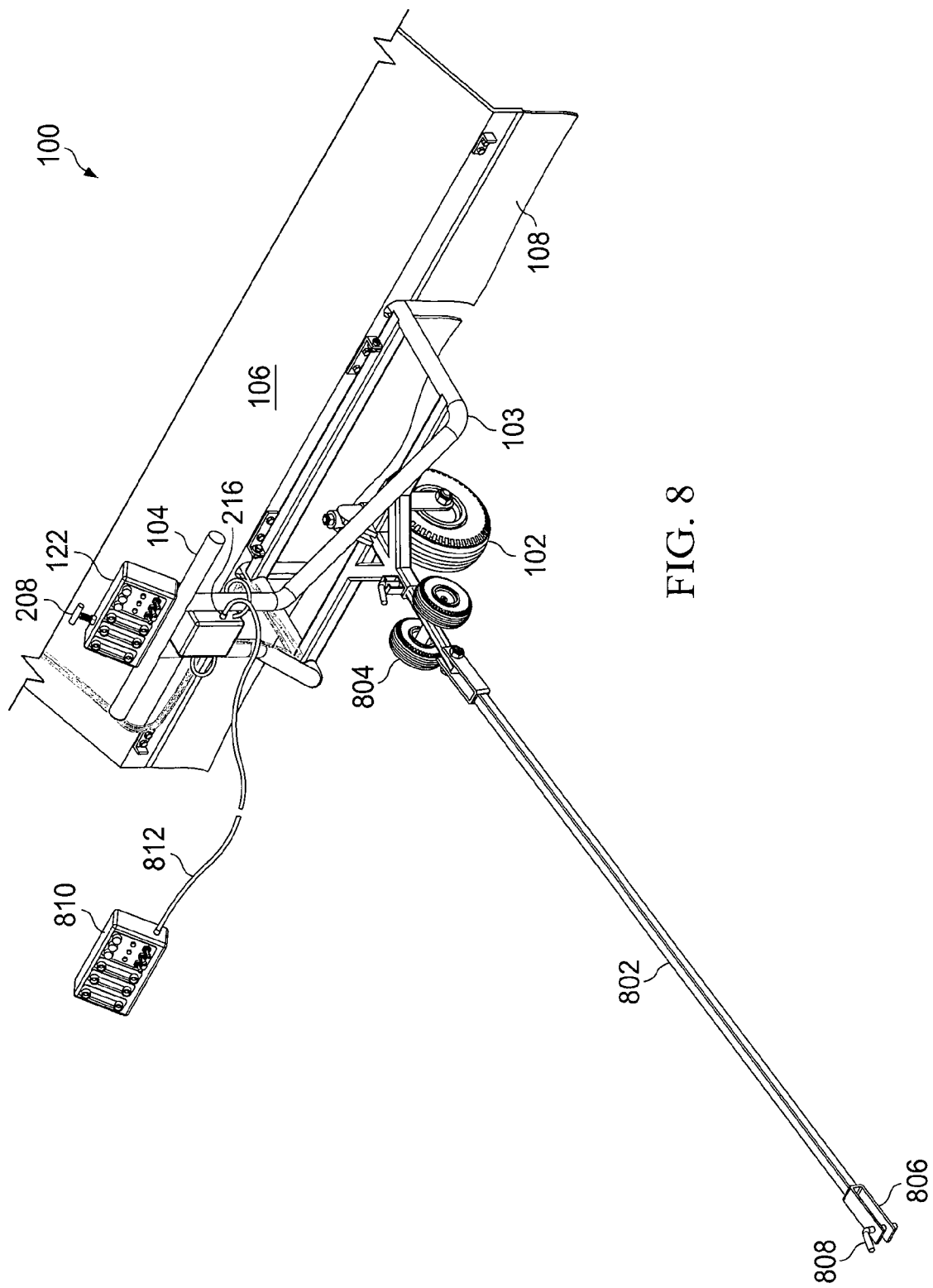

Systems and methods for applying substances to target areas are disclosed. The system may include a hood supported by a frame and moveable relative thereto between open and closed positions (e.g., in a hinged relationship). One or more spray heads coupled to the underside of the hood are configured to spray the target area when the hood is in the closed position, the spray heads and the hood configured such that the hood provides a wind barrier for the output from the spray heads. The system and methods further may include a liquid tank for holding the substance to be applied to the target area, an agitation system to achieve a desired mixing of the tank contents, and fluid pathways for delivery of the contents of the tank to the spray heads for application to the target area.

Other technical advantages will be apparent to those of ordinary skill in the art in view of the specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 1A-1C each illustrates perspective views at different angles of an example spraying apparatus, in accordance with certain embodiments of the present disclosure;

FIGS. 2A-2C each illustrates perspective views at different angles of a control panel, a handlebar, and other components of the spraying apparatus depicted in FIGS. 1A-1C, in accordance with certain embodiments of the present disclosure;

FIG. 3 illustrates a perspective view of a liquid tank, a battery housing, an agitator pump, a drain valve, and other components of the spraying apparatus depicted in FIGS. 1A-1C, in accordance with certain embodiments of the present disclosure;

FIG. 4 illustrates a perspective view of a liquid tank, a spray pump, a recovery valve, a flush valve, and other components of the spraying apparatus depicted in FIGS. 1A-1C, in accordance with certain embodiments of the present disclosure;

FIGS. 5A-5B each illustrates perspective views at different angles of the spraying apparatus depicted in FIGS. 1A-1C with portions of a hood pivoted to an open position, in accordance with certain embodiments of the present disclosure;

FIGS. 6A-6B each illustrates perspective views at different angles of the spraying apparatus depicted in FIGS. 1A-1C with a hood pivoted to an open position, in accordance with certain embodiments of the present disclosure;

FIG. 7 illustrates a perspective view of a CDA and other components of the spraying apparatus depicted in FIGS. 1A-1C, in accordance with certain embodiments of the present disclosure; and FIG. 8 illustrates a perspective view of the spraying apparatus depicted in FIGS. 1A-1C and a tow bar and remote controller that may optionally be attached thereto, in accordance with certain embodiments of the present disclosure.

Figure 1B:
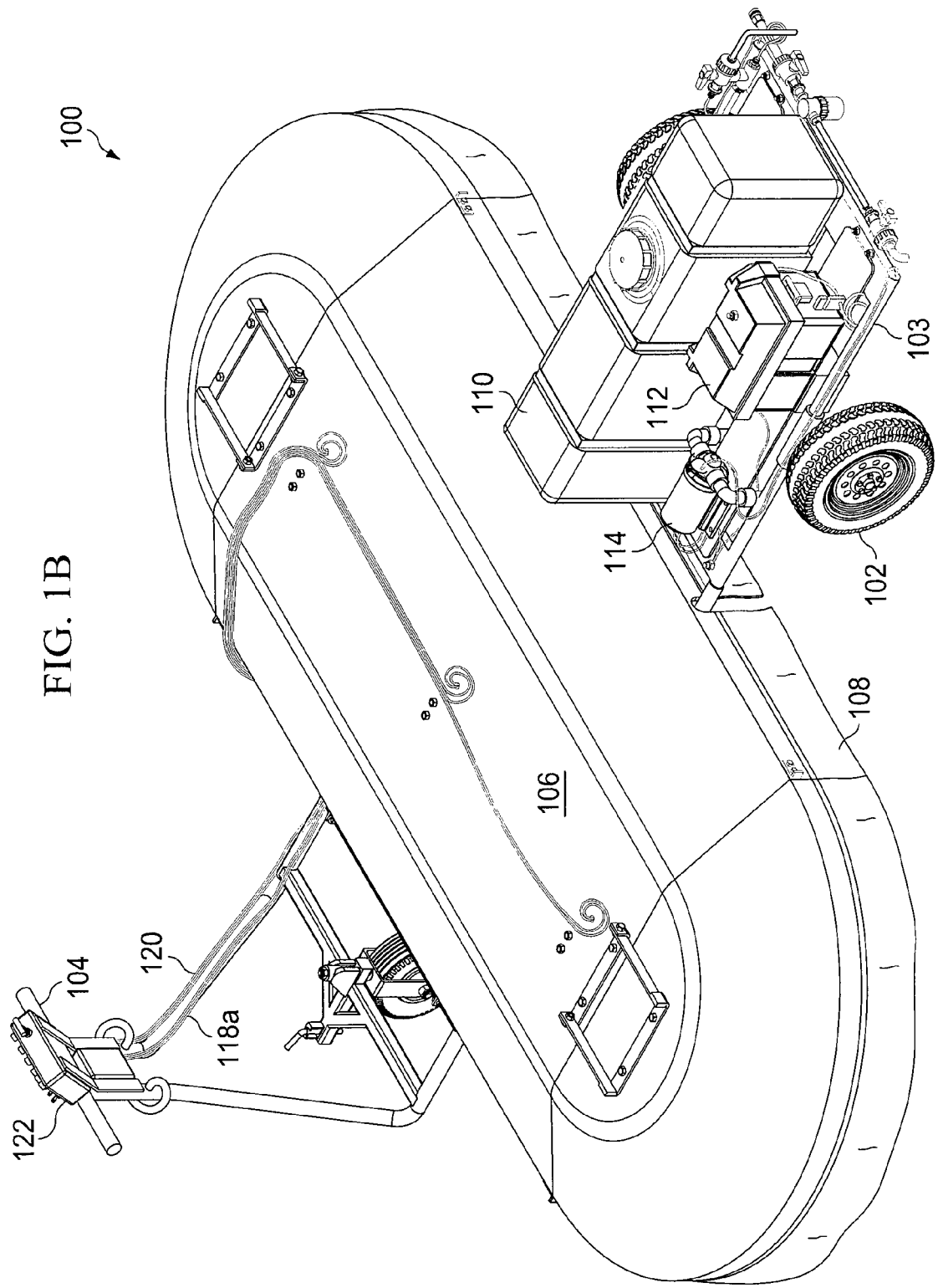
Figure 9:
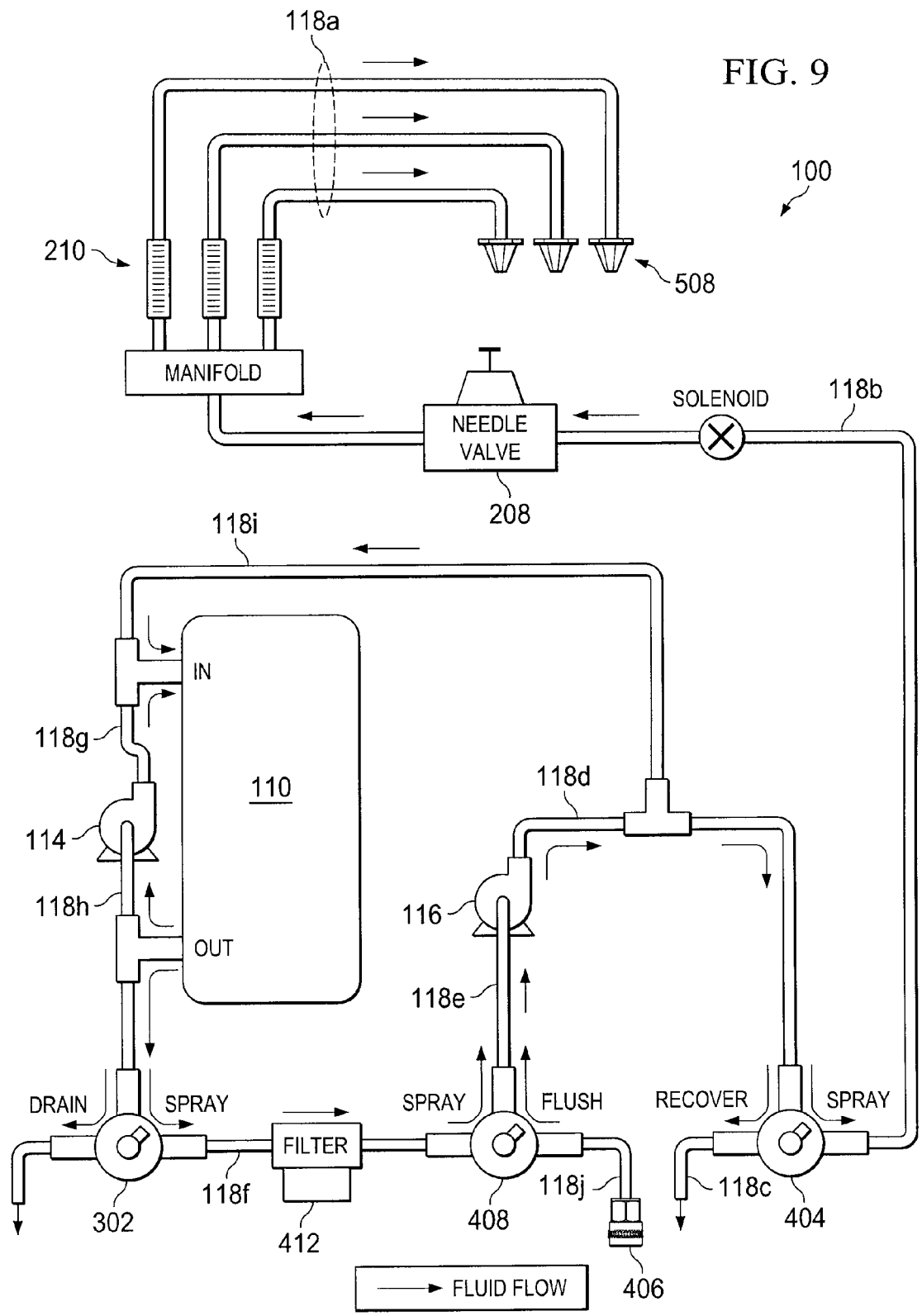

FIG. 9 illustrates example fluid pathways of the spraying apparatus depicted in FIGS. 1A-1C, in accordance with certain embodiments of the present disclosure.

DETAILED DESCRIPTION

Preferred embodiments and their advantages are best understood by reference to FIGS. 1A through 9, wherein like numbers are used to indicate like and corresponding parts.

FIGS. 1A-1C each illustrates perspective views at different angles of an example spraying apparatus 100, in accordance with certain embodiments of the present disclosure. As depicted in FIG. 1, spraying apparatus 100 may include wheels 102, frame 103, handlebar 104, hood 106, windskirt 108, liquid tank 110, battery housing 112, agitator pump 114, spray pump 116, fluid conduits 118, electrical wires 120, and a control panel 122.

Each wheel 102 may include any circular device that is capable of rotating on its axis and supporting at least a portion of the weight of spraying apparatus 100 to facilitate movement and/or transportation of spraying apparatus 100. In the embodiment depicted in FIGS. 1A-1C, spraying apparatus includes three wheels 102 coupled to frame 103. However, spraying apparatus 100 may include any suitable number of wheels. In certain embodiments, one or more of wheels 102 may be adapted for a particular use or application. For example, wheels 102 may be adapted for use on a golf green or other sensitive target area or surface and thus may include lightweight wheels, smooth surfaces (e.g., little or no tread), tracks, and/or other application-specific adaptations. As another example, wheels 102 may include non-pneumatic or "never-flat"-type tires to reduce maintenance required to maintain the wheels (e.g., repairing flats, maintenance of tire pressure, etc.).

Frame 103 may be any suitable structure configured to mechanically couple various components of spraying apparatus 100. Frame 103 may be constructed from any suitable material, including without limitation aluminum, steel, or other suitable metal; composites; etc. In certain embodiments, frame 103 may be adapted for use on golf greens or other sensitive target areas or surfaces and thus may include a lightweight metal, composite, or other material, and or may be at least partially hollow in order to provide a relatively lightweight spraying apparatus 100.

Handlebar 104 may be coupled to frame 103 and may be configured to allow an operator of spraying apparatus 100 to propel, steer, and/or control the movement of spraying apparatus 100, e.g., by appropriately pushing and/or pulling handlebar 104. Handlebar 104 may be constructed from any suitable metal and/or other material, including without limitation aluminum, steel, composites, and other suitable materials. In certain embodiments, handlebar 104 may be adapted for use on golf greens or other sensitive target areas or surfaces and thus may include lightweight materials and/or may be at least partially hollow in order to provide a relatively lightweight spraying apparatus 100.

Hood 106 may be coupled to frame 103 and may be configured to house one or more spray heads 508 (see FIGS. 6A, 6B and 7) and/or support windskirt 108. Hood 106 may be constructed from any suitable material, including without limitation fiberglass. In certain embodiments, hood 106 may be adapted for use on golf greens or other sensitive target areas or surfaces and thus may include lightweight fiberglass, composites, and/or other materials. In the operation of spraying apparatus 100, hood 106 may be a dome or other inverted bowl-like shape, with a generally concave lower end, as shown in FIGS. 1A-1C and may reduce or eliminate environmental effects such as wind on the spray produced by spray heads 508, thus permitting more uniform application. In addition, hood 106 may be designed (e.g., with sufficient height, width, and depth outside of the spray patterns of spray heads 508) such that the spray from spray heads 508 falls directly to the ground or other surface instead of first impacting the hood or other components of spraying apparatus 100, thus also permitting a more uniform spray distribution and decreasing the likelihood of liquid accumulating on and/or "dripping" from hood 106, windskirt 108, or other components of apparatus 100. In the closed position of hood 106 depicted in FIGS. 1A-1C, the top side of hood 106 faces generally upwards and may be of generally convex or other suitable shape, and the underside of hood 106 faces generally downwards (i.e., towards the ground).

Windskirt 108 may be coupled to hood 106, for example at the bottom edge of hood 106, such that windskirt 108 is oriented in a substantially vertical or other appropriately angled position during operation of spraying apparatus 100 extending from the lower portion of hood 106 to approximately substantially even with the ground or other area. Windskirt 108 may be constructed from any suitable material, including without limitation a plastic or rubber material. As shown for example in FIGS. 1A-1C, windskirt 108 may include one or more portions. In certain embodiments, windskirt 108 may be adapted for use on golf greens or other sensitive target areas or surfaces and thus may include a flexible and/or non-rigid material that may not damage any area or surface portions that may come into contact with windskirt 108. In the operation of spraying apparatus 100, windskirt 108 may reduce or eliminate environmental effects (e.g., wind) on the spray produced by spray heads 508, thus permitting more efficient application. In addition, windskirt 108 may be designed (e.g., with sufficient width, and depth about the spray patterns of spray heads 508) such that the spray from spray heads 508 falls without disruption from windskirt 108, thus also permitting more uniform distribution of spray and decreasing the likelihood of liquid accumulating on and/or "dripping" from windskirt 108.

Liquid tank 110 may be mounted to frame 103 in any suitable manner and may be fluidicly coupled to spray pump 116, control panel 122, and other components of spraying apparatus 100, as described herein. In operation, liquid tank 110 may hold and/or store fluid (e.g., herbicide, insecticide, fungicide, other biocide, fertilizer, biostimulant, plant growth regulator, other nutritional product, turf paint, dye, and/or other fluid, liquid, mixture, solution, suspension, colloid, etc.) to be applied via spray heads 508 and may convey such fluid to spray pump 116.

Battery housing 112 may be mounted to frame 103 in any suitable manner and may be configured to house a battery and protect such battery from environmental conditions and/or corrosive elements of fluids that may be used with apparatus 100. The battery housed by battery housing 112 may be electrically coupled to agitator pump 114, spray pump 116, control panel 122, spray heads 508, and/or other components of spraying apparatus 100 via electrical wires 120. Additional components may be included in apparatus 100 to promote ease and efficiency of use (e.g., foamers, lights). The battery may provide electrical energy to one or more of such components, e.g., during operation of spraying apparatus 100.

Agitator pump 114 may be mounted to frame 103 in any suitable manner and may be fluidicly coupled to liquid tank 110. In certain fluid solutions or colloids, solutes of the solution or dispersed phases of the colloids may settle out of the solution or colloid. Such settling of solutes or dispersed phases may cause numerous problems. For example, solutes or dispersed phases that settle may accumulate and solidify, potentially leading to the blocking of pump intakes, fluid conduits, etc. of spraying apparatus 100. In addition, settled solutes or dispersed phases may cause a fluid to have a concentration other than that desired for application by spraying apparatus 100. Accordingly, agitator pump 114 may comprise any apparatus configured to agitate the contents of liquid tank 110 so as to prevent, eliminate, reduce, or inhibit settling of solutes or dispersed phases.

In accordance with certain exemplary embodiments, the agitator pump 114 may be powered by the battery, by solar powered cells, or by other suitable sources of electrical energy. Alternately, agitation of the liquid tank 110 may be accomplished by a mechanical means, e.g., a stirrer disposed within the tank 110 that is rotated using a motor; by manual action (e.g., an operator turning a crank); or by movement of the apparatus 100 (e.g., the stirrer is operatively coupled to the wheels of apparatus 100, preferably using one or more gears or a gear train/drive system, so that wheel movement drives the stirrer).

In addition, agitator pump 114 may be configured to agitate liquid tank 110 so as to mix a first substance in liquid tank 110 (e.g., water) with a second substance (e.g., herbicide, insecticide, fungicide, other biocide, fertilizer, biostimulant, plant growth regulator, other nutritional product, turf paint, and/or dye) added to liquid tank 110 to create a solution, suspension, colloid, or other combination or mixture of the first substance and the second substance. For example, an operator of spraying apparatus 100 may fill liquid tank 110 with water, add a concentrated biocide, fertilizer, or nutritional product to liquid tank 110 (e.g., in a tablet or concentrated liquid form), and activate the agitator pump 114 or mechanical agitation means to mix the biocide, fertilizer or nutritional product into solution with the water.

Figure 2A:
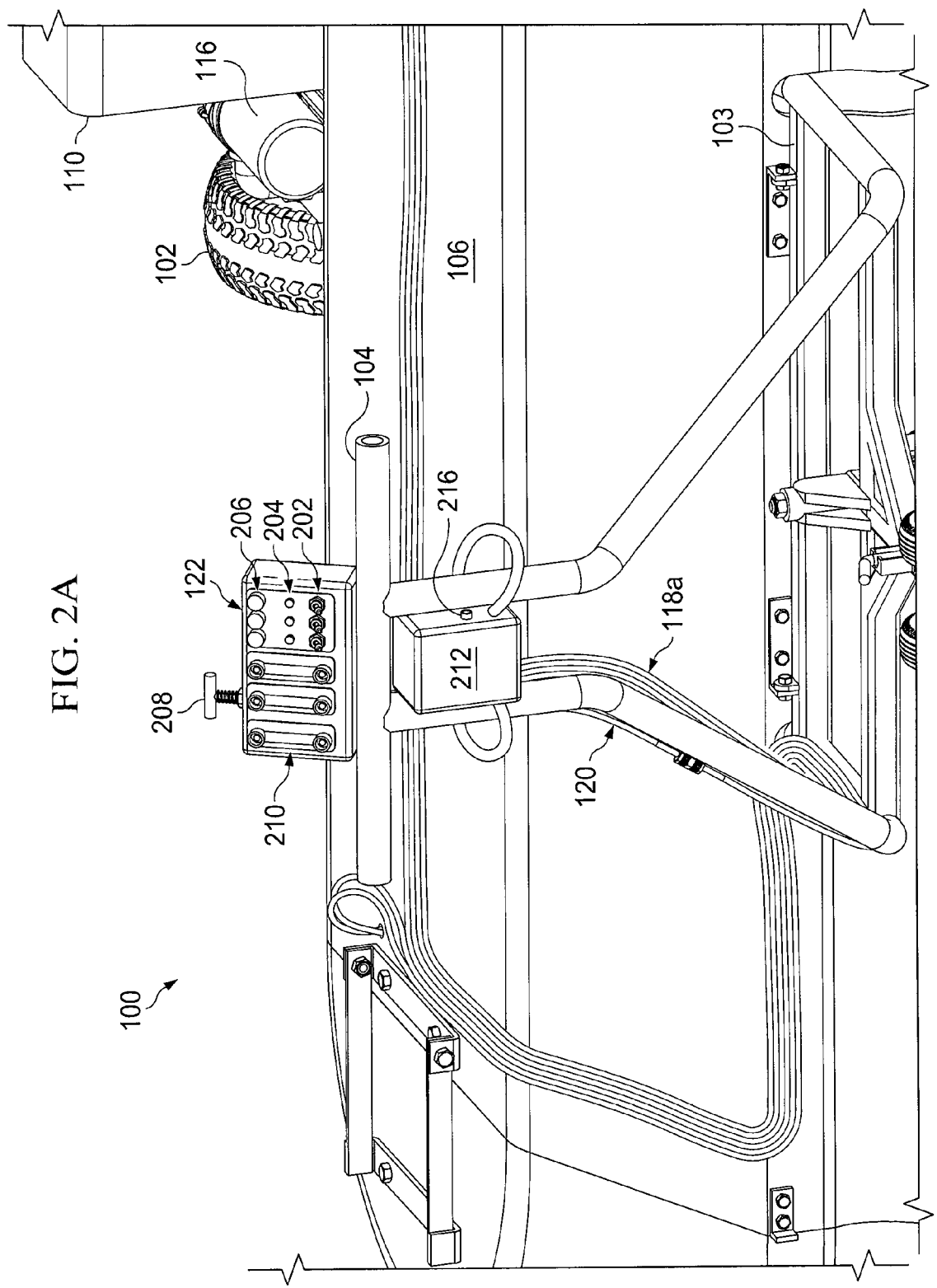
Figure 2B:
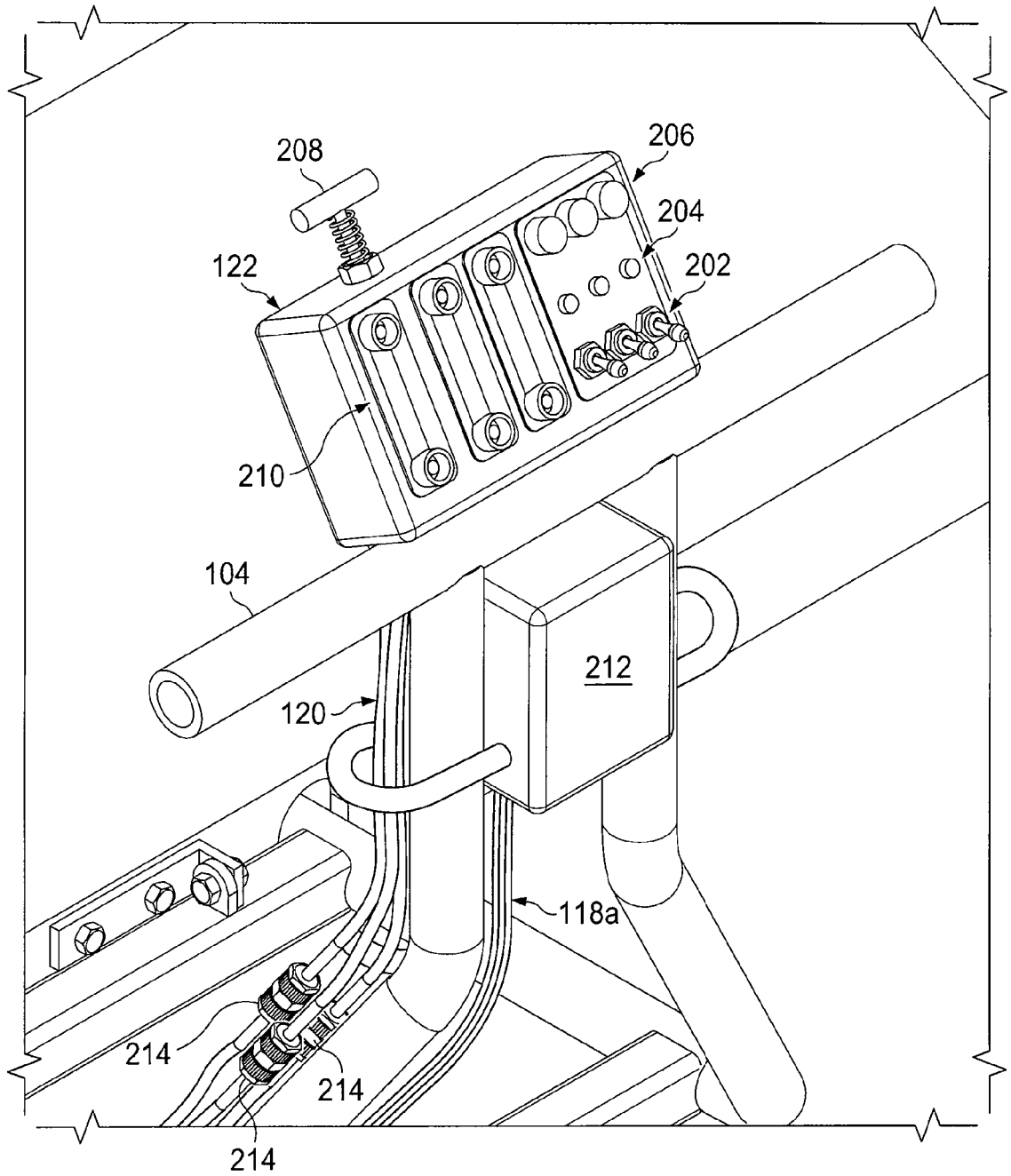
Figure 2C:
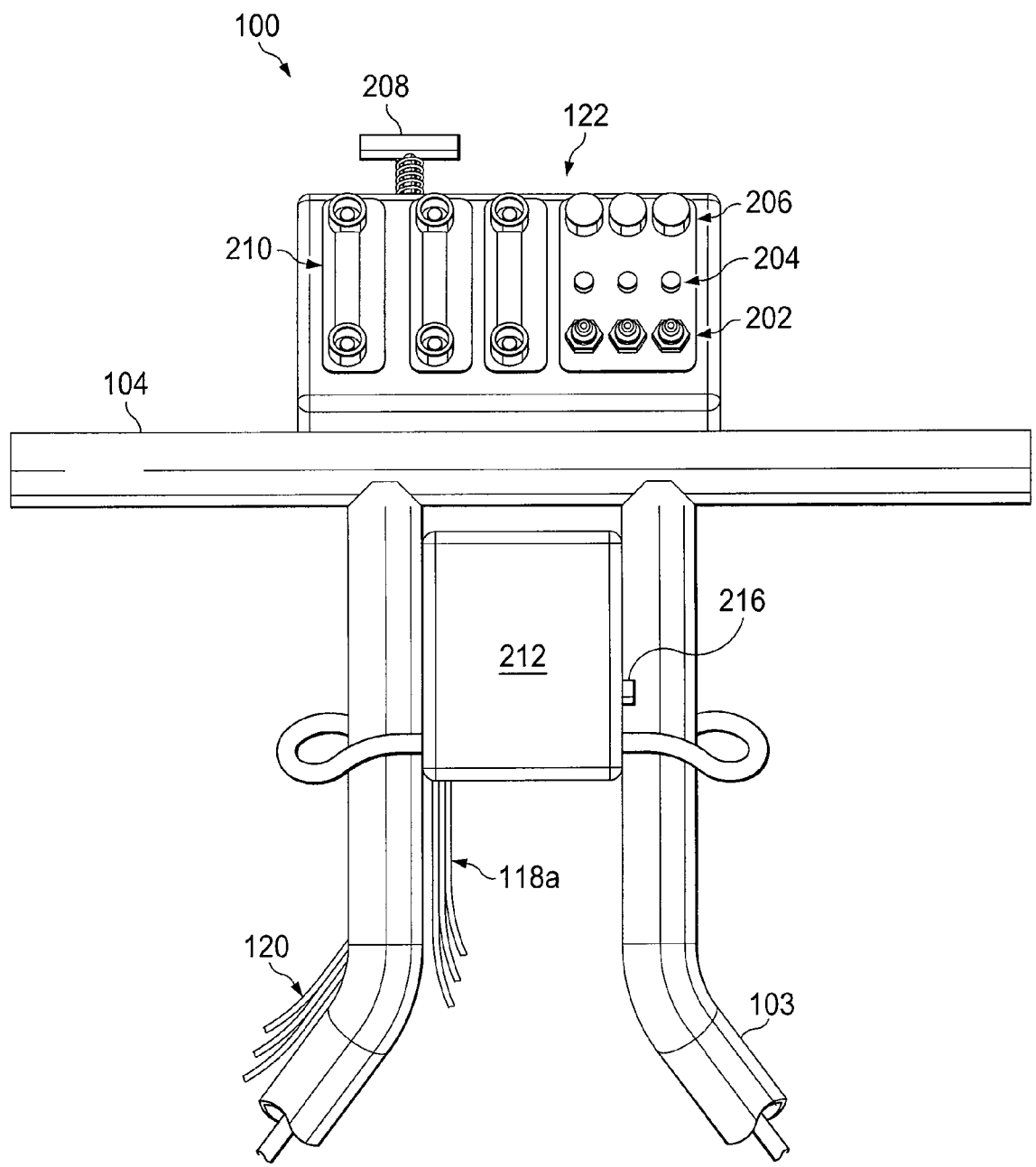

Spray pump 116 may be mounted to frame 103 in any suitable manner and may be fluidicly coupled to liquid tank 110, spray heads 508, and/or flow control valve 208 of control panel 122 (see FIGS. 2A-2B). In operation, spray pump 116 may draw liquid from liquid tank 110 and direct it to spray heads 508 via fluid conduits 118.

Fluid conduits 118 may include any tube, pipe, duct, channel, trough, and/or combination thereof through which liquids may be conveyed. In certain embodiments, fluid conduits 118 may include tubing, such as nylon or plastic tubing. As shown in FIGS. 1A-1C and other figures, fluid conduits 118 may comprise a pathway to convey liquids between liquid tank 110, spray pump 116, spray heads 508, and the various other components of apparatus 100. See FIG. 9. Frame 103 may comprise a portion of fluid conduits 118, e.g., by the frame itself being formed or adapted to provide not only structural support but also serve a fluid delivery function.

Electrical wires 120 may include any electrical conductor through which electrical energy may be conveyed (e.g., copper wire surrounded by non-conductive insulator). The electrical circuits of the apparatus 100 may be grounded to the frame 103. As shown in FIGS. 1A-1C and other figures, electrical wires 120 may convey electrical energy from a battery housed in battery housing 112 to one or more other components of spraying apparatus 100 (e.g., agitator pump 114, spray pump 116, control panel 122, spray heads 508.). In additional electrical wires 120 may convey electrical energy between control panel 122 and one or more other components of spraying apparatus 100 (e.g., agitator pump 114, spray pump 116, control panel 122, spray heads 508) to allow communication of control and/or information signals to or from such components.

Control panel 122 may be electrically and/or fluidicly coupled to one or more components of spraying apparatus 100 (e.g., agitator pump 114, spray pump 116, control panel 122, spray heads 508) and may include any suitable switches, valves, buttons, knobs, dials, gauges, displays, lights, indicators, other user interface elements, and/or any combination thereof to allow an operator of spraying apparatus 100 to monitor and/or control spraying apparatus 100 and one or more of its components. As shown in FIGS. 1A-1C, control panel 122 may be mounted on or adjacent to handlebars 104, in order to allow an operator to view control panel 122 while pushing or pulling spraying apparatus 100. Alternately, the control panel 122 may be tethered via a line 812 to apparatus 100 to permit remote operation, e.g., from the seat of a separate vehicle pulling apparatus 100 across a target area or surface. See for example remote controller 810 shown in FIG. 8. Control panel 122 is described in greater detail with respect to FIGS. 2A-2B below.

As depicted in FIG. 1C (and also in FIG. 7), hood 106 may include one or more passages or holes 124 substantially proximate to spray heads 508 that allow passage of fluid conduits 118 and/or electrical wires 120 from the top of hood 106 to the underside of hood 106, so as to provide electrical energy and liquids to spray heads 508 or other components that may be disposed on or mounted to the underside of hood 106. In addition, as shown in FIGS. 1A-1C, fluid conduits 118 and/or electrical wires 120 may be routed primarily above or on top of hood 106, such that only relatively small portions of such fluid conduits 118 and/or electrical wires 120 are routed below the hood 106. By routing fluid conduits 118 and/or electrical wires 120 on top of hood 106, such fluid conduits 118 and/or electrical wires 120 may be protected from corrosive or other deleterious effects of the spray from spray heads 508. In addition, as shown and described in greater detail with respect to FIG. 4 below, portions of fluid conduits 118 and/or electrical wires 120 may also be substantially isolated or protected from environmental conditions and/or corrosive or other deleterious effects of spray from spray heads 508 by routing such fluid conduits 118 and/or electrical wires 120 through hollow portions of frame 103. Alternately or in addition, at least a portion of the hood and/or a hollow frame may be used as a portion of a fluid or electrical pathway between two or more components of the apparatus 100, thus eliminating the need for a component separate from the hood and/or frame for fluid or electrical energy conveyance.

FIGS. 2A-2B each illustrates perspective views at different angles of control panel 122, handlebar 104, and other components of spraying apparatus 100 depicted in FIGS. 1A-1C, in accordance with certain embodiments of the present disclosure. As shown in FIG. 2A, control panel 122 may include one or more switches 202, power indicators 204, CDA indicators 206, flow control valves 208, and flow rate meters 210.

Each switch 202 may include any mechanical, electrical, or electromechanical switch configured to connect or disconnect an electrical circuit, in order to control one or more components of spraying apparatus 100. For example, as depicted in FIG. 2A, control panel 122 may include switches 202 for turning on or off agitator pump 114, spray pump 116, and/or spray heads 508.

Each power indicator 204 may include an LED, light, or other appropriate indicator to indicate whether particular components of spraying apparatus 204 are powered on, and/or the state of operation. For example, as depicted in FIG. 2A, control panel 122 may include power indicators 204 for indicating whether one or more of pump 114, spray pump 116, and/or spray heads 508 are powered on (e.g., whether switches 202 associated with each of pump 114, spray pump 116, and spray heads 508 are in their "on" or "off" positions) or operating.

Each CDA indicator 206 may indicate for each spray head 508 whether such spray head 508 and/or the motor associated therewith is operating, and/or the conditions of such operation. In the example depicted in FIG. 2A, control panel 122 includes three CDA indicators 206 to indicate the operation of three spray heads 508.

Flow control valve 208 may include any device, system, or apparatus configured to control and/or regulate the flow of fluids by opening, closing, or partially obstructing fluidic passageways (e.g., fluid conduits 118). Flow control valve 208 may be fluidicly coupled to liquid tank 110, spray heads 508, or other components of apparatus 100, and may be adjusted by an operator of spraying apparatus 100 in order to control the flow rate, e.g., of liquid conveyed to spray heads 508. In certain embodiments, flow control valve 208 may include a needle valve. Although FIG. 2A depicts control panel 122 including a single flow control valve 208, certain implementations of spraying apparatus 100 may include more than one flow control valve 208, for example, to permit individual control of liquid flow to each of a plurality of spray heads 508.

Each flow rate meter 210 may include any device, system, or apparatus configured to display information to an operator of spraying apparatus 100 regarding flow rate, e.g., the rate that liquid is supplied to spray heads 508. In certain embodiments, each flow rate meter 210 may meter the flow of liquid to one or more spray heads 508, as shown in FIG. 2A.

In addition to the controls depicted in FIG. 2A, control panel 122 may include any other suitable control, display, gauge, or indicator. For example, in embodiments of spraying apparatus 100 that include rotating spray heads 508 (e.g., CDAs), control panel 122 may include a spray head speed control configured to control or regulate the rotational speed of spray heads 508. In such embodiments, control panel 122 may also include a rotational speed gauge for the spray heads 508. Switches for lights and one or more foamers also may be included in control panel 122.

As also shown by FIGS. 2A-2B, electrical wires 120 coupling control panel 122 to other components of spraying apparatus 100 may include detachable connectors 214 (e.g., standard nylon wire connectors), which may allow components of spraying apparatus 100 to be electrically coupled to a control panel other than control panel 122. Accordingly, spraying apparatus 100 may alternatively be towed by a cart or other vehicle, and components of apparatus 100 may be coupled to a second, remote control panel visible to the operator or a passenger of such cart or other vehicle, to facilitate control of components of spraying apparatus 100 by the operator or other passenger.

As shown in FIGS. 2A-2B, spraying apparatus 100 may also include a junction box assembly 212. The junction box 212 may comprise a terminal strip connecting control panel 122 to wires 120. Box 212 also may comprise a connector 216 used to electrically couple a remote controller 810 to the terminal strip within box 212. Power from a battery disposed within housing 112, as well as a ground to frame 103, also may be connected to the terminal strip within junction box 212.

In accordance with one embodiment, the junction box may include a solenoid valve that controls the flow of fluid to the fluid control apparatus for the delivery of fluid to the one or more CDAs of apparatus 100. As shown in FIG. 9, such fluid control apparatus may comprise a needle valve 208, a manifold, flow meters 210, and the fluid conduits 118, 118a required to establish a fluid pathway between solenoid valve 208 and the CDAs 508. The solenoid valve receives a supply of fluid for application via line 118b, which is operatively coupled to the various components that also may be included in the fluid supply system of apparatus 100, e.g. as shown in FIG. 9, and described in further detail herein.

FIG. 3 illustrates a perspective view of liquid tank 110, battery housing 112, agitator pump 114, drain valve 302, and other components of spraying apparatus 100 depicted in FIGS. 1A-1C, in accordance with certain embodiments of the present disclosure. Liquid tank 110, battery housing 112, and agitator pump 114 are described in greater detail above with respect to FIGS. 1A-1C.

Drain valve 302 may include any device, system, or apparatus configured to control and/or regulate the flow of fluids by opening, closing, or partially obstructing fluidic passageways. As shown in FIG. 3, drain valve 302 may include a knob 304 such that an operator may open or close drain valve 302. Drain valve 302 may be fluidicly coupled to liquid tank 110 via a fluid conduit 118, such that when knob 304 is moved from its closed to its open position, the contents of liquid tank 110 may pass through drain valve 302, emptying tank 110 by gravity flow. In certain embodiments, another fluid conduit (e.g., a hose) or container may be coupled to drain valve 302 or positioned at the outlet of valve 302 in order to capture liquid passing through drain valve 302. In accordance with certain embodiments, drain valve 302 comprises a two position valve, wherein the center line to the valve connects to the side line to the valve toward which the handle 304 is rotated (with the other side line to the valve then off).

FIG. 4 illustrates a perspective view of liquid tank 110, spray pump 116, recovery valve 402, flush valve 408, and other components of spraying apparatus 100 depicted in FIGS. 1A-1C, in accordance with certain embodiments of the present disclosure. Liquid tank 110 and spray pump 116 are described in greater detail above with respect to FIGS. 1A-1C.

Recovery valve 402 may include any device, system, or apparatus configured to control and/or regulate the flow of fluids by opening, closing, or partially obstructing fluidic passageways. As shown in FIG. 4, recovery valve 402 may include a knob 404 such that an operator may open or close recovery valve 402. In accordance with certain embodiments, valve 402 comprises a two position valve, wherein the center line to valve 402 connects to the side line toward which the handle 404 is rotated (with the other side line then off). Recovery valve 402 thus may be fluidicly coupled via fluid conduits 118 to spray heads 508 and other components of spraying apparatus 100 (including, without limitation, other fluid conduits 118) such that when knob 404 is moved to a first open position, unsprayed liquid present in components of spraying apparatus 100 (e.g., liquid tank 110) may be directed to the spray heads 508, and when knob 404 is moved to a second open position unsprayed liquid may be recovered via line 118c, for example, so that such liquid does not go to waste. In certain embodiments, fluid conduit 118a coupled to valve 402 may be coupled to liquid tank 110, such that recovered liquid is returned to liquid tank 110.

Flush valve 408 may include any device, system, or apparatus configured to control and/or regulate the flow of fluids by opening, closing, or partially obstructing fluidic passageways. As shown in FIG. 4, flush valve 408 may include a knob 410 such that an operator may open or close flush valve 408. In accordance with certain embodiments, valve 408 comprises a two position valve, wherein the center line connects to the side line toward which the know 410 is rotated (with the other side line then off). Flush valve 408 may be fluidicly coupled via fluid conduits 118 to liquid tank 110, spray heads 508, and other components of spraying apparatus 100 (including, without limitation, other fluid conduits 118) such that when knob 410 is moved to a first open position, components of spraying apparatus 100 may be flushed by a hose or other pressurized source of water coupled to flush intake 406.

Flushing of spraying apparatus 100 may be beneficial for many reasons. For example, because certain fluid conduits 118 may be relatively narrow (e.g., approximately one-fourth of an inch or smaller) and any chemical residual (e.g., solute or dispersed phase) remaining in such fluid conduits 118 may cause blockage or coagulation. In addition, because spraying apparatus 100 may be used to spray many different types of liquids, it may be desirable to completely flush spraying apparatus 100 of a first liquid before introducing a second liquid, in order to prevent mixture of the two liquids.

As also shown in FIG. 4, flush valve 408 may be fluidicly coupled to a filter 412. Filter 412 may reduce or remove unwanted particles or dirt from the liquid conveyed from tank 110 (for example, to help prevent clogging or fouling of spray heads 508), e.g., when knob 410 is moved to a second open position to permit spraying.

As depicted in FIG. 4, one or more of fluid conduits 118 and/or electric wires 120 may be routed inside of hollow portions of frame 103, in order to protect such fluid conduits 118 and/or electrical wires 120 from environmental conditions and/or any corrosive components of liquid applied by spraying apparatus 100.

Figure 5A:
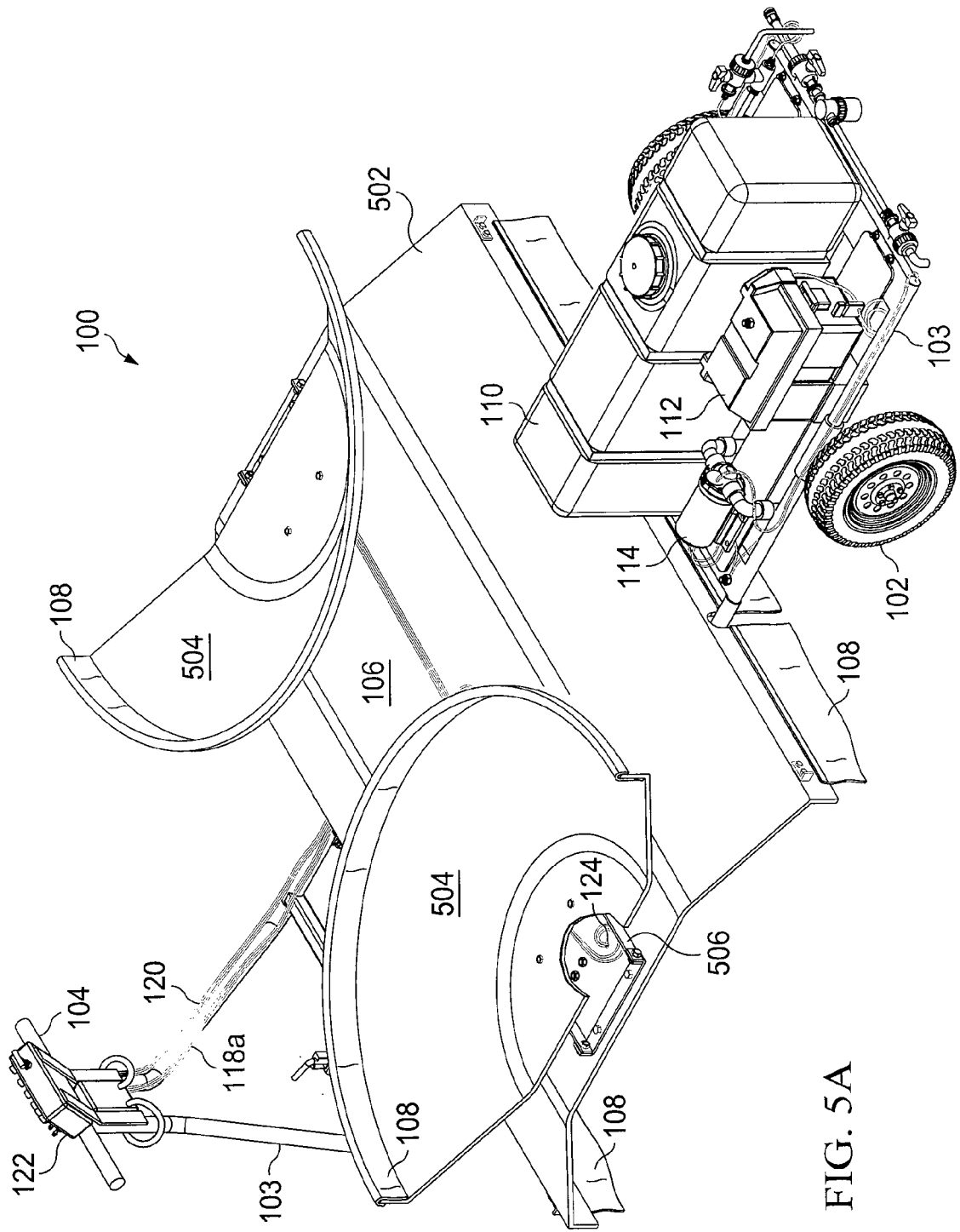
Figure 6B:
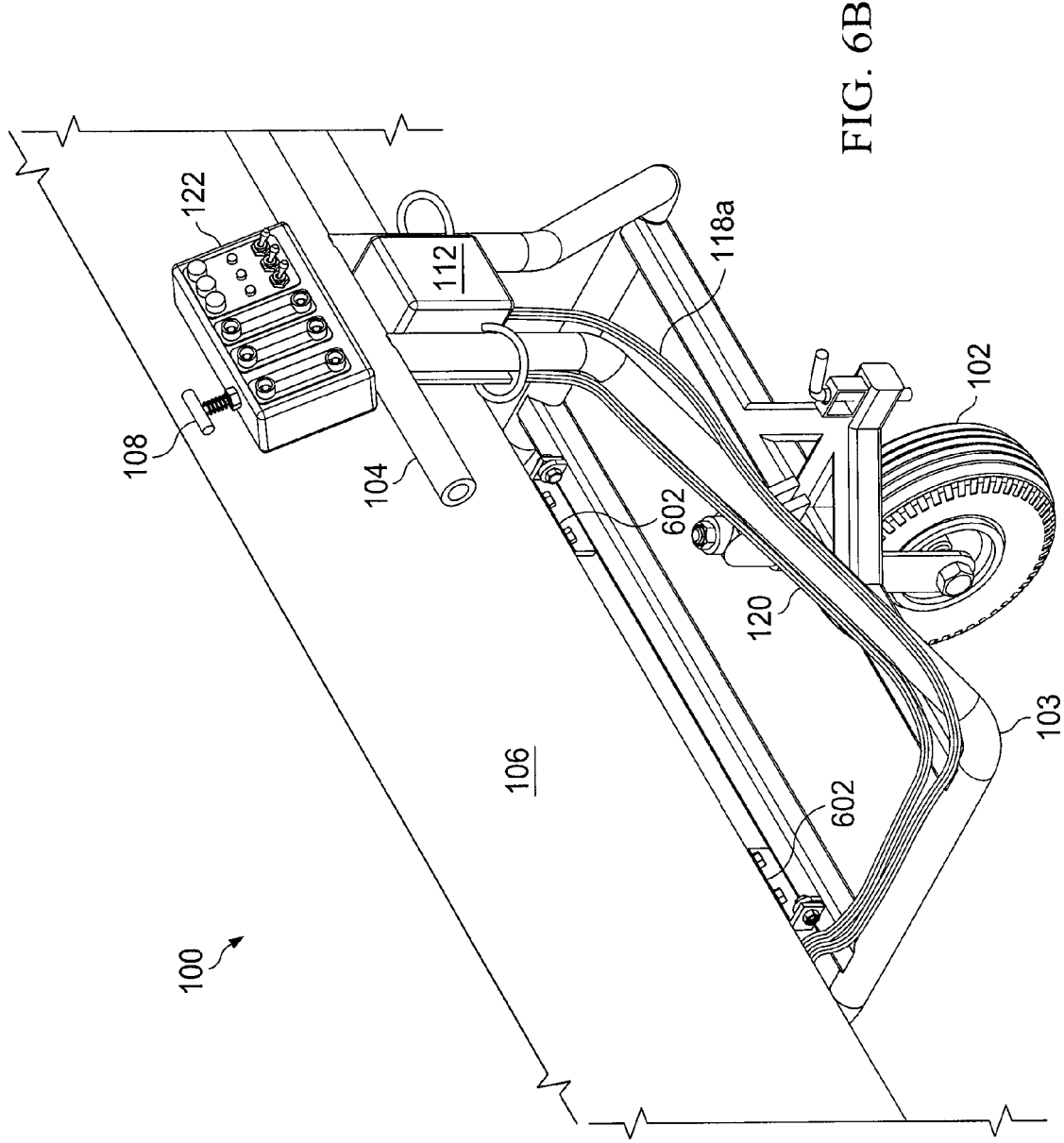
Figure 7:
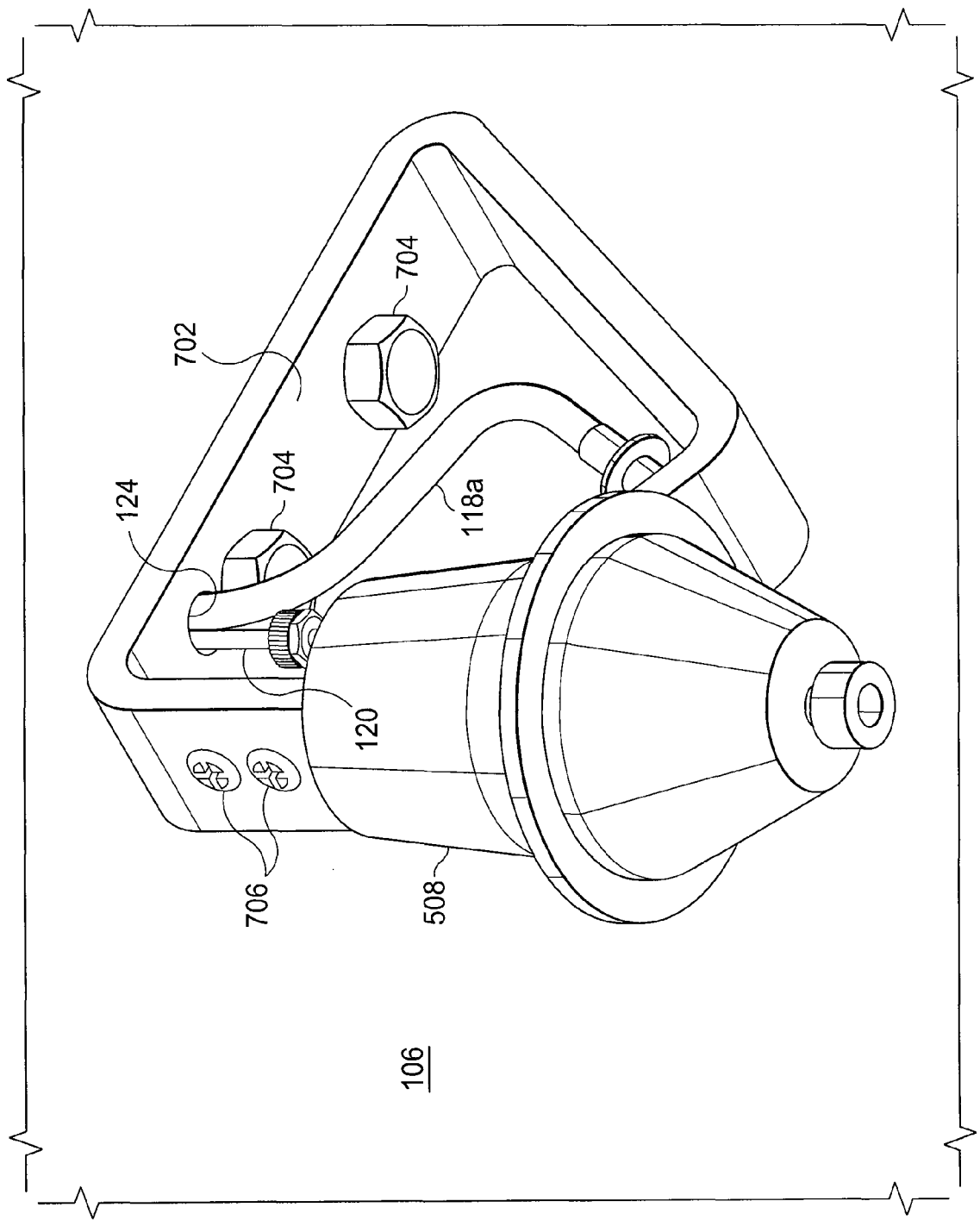

FIGS. 5A-5B each illustrates perspective views at different angles of spraying apparatus 100 depicted in FIGS. 1A-1C with certain portions of hood 106 pivoted to an open position, in accordance with certain embodiments of the present disclosure. As depicted in FIGS. 5A-5B, hood 106 may include main portion 502 coupled via hinges 506 to one or more end portions 504. When desired by a user or operator of spraying apparatus 100, one or more end portions 504 may be tilted and/or rotated upward relative to main portion 502, into a position such as that depicted in FIGS. 5A-5B, for example. When end portions 504 are tilted and/or rotated upward as shown in FIGS. 5A-5B, the overall footprint (e.g., width) of spraying apparatus 100 may be reduced, thus allowing for increased ease of maneuverability, transport, and/or storage.

Each portion 502 and 504 of hood 106 may be constructed of any suitable material or materials, including without limitation fiberglass. Also, as depicted in FIGS. 5A-5B, each portion 502 and 504 may include one or more portions of windskirt 108. Each hinge 506 may include any system, device or apparatus suitable to couple main portion 502 to an end portion 504, such that end portion 504 rotates relative to main portion 502 about a fixed axis of rotation (e.g., about the horizontal geometrical axis of the hinge).

As depicted in FIG. 5B (and also FIGS. 6B and 7), one or more spray heads 508 may be mounted to or coupled to the underside of hood 106 such that in operation, spray heads 508 may spray liquid droplets onto a target surface below and spray heads 508 and their sprayed droplets may be protected from wind by dome 106 and windskirt 108. Each spray head 508 may include any suitable device, system or apparatus configured to receive a liquid via a conduit and spray such liquid onto grass or another surface. The spray head 508 may comprise, for example, a control droplet applicator (CDA). In certain embodiments, spray heads 508 may spray droplets of liquid in a pattern resembling a parabolic cone.

FIGS. 6A-6B each illustrates perspective views at different angles of spraying apparatus 100 depicted in FIGS. 1A-1C with hood 106 pivoted to an open position relative to frame 103, in accordance with certain embodiments of the present disclosure. As depicted in FIGS. 6A-6B, main portion 502 or another portion of hood 106 may be coupled via hinges 602 to frame 103. When desired by a user or operator of spraying apparatus 100, hood 106 may be tilted and/or rotated upward relative to frame 103, into a position such as that depicted in FIGS. 6A-6B, for example. Hood 106 may be tilted and/or rotated upward as shown in FIGS. 6A-6B in order to provide convenient access (e.g., for the purposes of maintenance and/or cleaning) to the underside of hood 106 and/or to spray heads 508 coupled thereto.

Each hinge 602 may include any system, device or apparatus suitable to couple hood 106 to frame 103, such that hood 106 rotates relative to frame 103 about a fixed axis of rotation (e.g., about the horizontal geometrical axis of the hinge). In certain embodiments, the geometrical axis of hinge 602 may be substantially perpendicular to the geometrical axis of hinge 506.

FIG. 7 illustrates a perspective view of a spray head 508 and other components of spraying apparatus 100 depicted in FIGS. 1A-1C, in accordance with certain embodiments of the present disclosure. As depicted in FIG. 7, each spray head 508 may be coupled to the underside of hood via a respective bracket 702. Also as shown in FIG. 7, each bracket 702 may be coupled to hood 106 by bolts 704, or any other suitable structural member, and may also be coupled to its respective spray head 508 by screws 706, or any other suitable structural member.

FIG. 7 and other figures herein also depict holes 124 that may be formed in hood 106 that may allow fluid conduits 118 and/or electrical wires 120 to pass through hood 106 and couple to spray head 508, as described in greater detail above with respect to FIGS. 1A-1C.

FIG. 8 illustrates a perspective view of spraying apparatus 100 depicted in FIGS. 1A-1C and a tow bar 802 that may optionally be attached thereto, in accordance with certain embodiments of the present disclosure. As depicted in FIG. 8, tow bar 802 may include a hitch 804 that may couple tow bar 802 to frame 103 of spraying apparatus 100. In addition, tow bar may include a hitch 806 that may allow tow bar 802 to couple to a golf cart or other vehicle for towing of spraying apparatus 100. Any of hitch 804 and 806 may include any suitable hitch, such as spring loaded pin 808 shown in FIG. 8, for example.

Using the methods and systems disclosed herein, problems associated with conventional approaches to applying liquids (e.g., herbicide, insecticide, fungicide, other biocide, fertilizer, biostimulant, plant growth regulator, other nutritional product, turf paint, dye, and/or other solution and/or colloid) to grass or other surfaces, and in particular golf greens, may be reduced or eliminated. For example, the methods and systems disclosed herein may provide a relatively lightweight spraying apparatus that may reduce or eliminate damage to surfaces sensitive to compaction. In addition, the methods and systems disclosed herein may provide a hood and windskirt protecting sprayed droplets from wind during spraying, wherein the hood has hinged and pivoting end portions that may be rotated upward about a horizontal axis in order to improve maneuverability of the spraying apparatus during transport or reduce the footprint of the spraying apparatus for storage. Furthermore, the methods and systems disclosed herein may provide a hood that is hingedly coupled to the frame of the spraying apparatus such that the hood may be rotated upward about a horizontal axis in order to improve access to the underside of the hood and spray heads coupled to the underside thereof for cleaning and/or maintenance purposes.

Although the present disclosure has been described in detail, it should be understood that various changes, substitutions, and alterations can be made hereto without departing from the spirit and the scope of the invention as defined by the appended claims.

What is claimed is:

1. A spraying apparatus for applying liquid to a surface, comprising:
   a frame;
   a dome-shaped hood supported by the frame in a closed position of the hood and directly coupled to the frame via a first hinge having a first substantially horizontal geometric axis, the hood having a top side facing generally upwards and an underside facing generally downwards while in the closed position, the hood movable relative to the frame from the closed position substantially parallel to a surface to an open position about the substantially horizontal geometric axis of the first hinge, the hood comprising a first portion and at least one second portion coupled to the first portion via a second hinge having a second substantially horizontal geometric axis substantially perpendicular to the substantially horizontal geometric axis while the hood is in the closed position, the at least one second portion movable relative to the first portion from a first position substantially parallel to the first portion to a second position about the second substantially horizontal geometric axis; and
   one or more spray heads coupled to the underside of the hood and configured to spray a liquid on the surface, the one or more spray heads and the dome-shaped hood configured such that the dome-shaped hood provides a wind barrier for the liquid sprayed from the one or more spray heads.

2. A spraying apparatus according to claim 1, the one or more spray heads including one or more control droplet applicators (CDAs).

3. A spraying apparatus according to claim 2, further comprising a control panel fluidicly coupled to the one or more CDAs, the control panel including a user interface to allow an operator of the spraying apparatus to control a rotational speed of at least one of the one or more CDAs.

4. A spraying apparatus according to claim 1, further comprising a liquid tank fluidicly coupled to the one or more spray heads and configured to hold the liquid.

5. A spraying apparatus according to claim 4, further comprising a spray pump fluidicly coupled to the one or more spray heads and the liquid tank and configured to pump liquid from the liquid tank to the one or more spray heads.

6. A spraying apparatus according to claim 4, further comprising an agitator pump fluidicly coupled to the liquid tank and configured to agitate the liquid.

7. A spraying apparatus according to claim 6, the agitator pump configured to mix the liquid and a substance together.

8. A spraying apparatus according to claim 7, wherein the substance is selected from the group consisting of a biocide, a fertilizer, a plant growth regulator, a biostimulant, turf paint, a herbicide, an insecticide, and a dye.

9. A spraying apparatus according to claim 7, wherein the substance is a solid, and the agitator pump is configured to dissolve the solid into the liquid.

10. A spraying apparatus according to claim 4, further comprising:
    a flush intake configured to interface with a source of pressurized liquid; and
    a flush valve fluidicly coupled to the flush intake and at least one of the liquid tank and the one or more spray heads such that when the flush valve is open, the source of pressurized liquid may flush at least one of the liquid tank and the one or more spray heads.

11. A spraying apparatus according to claim 10, wherein the flush intake is configured to interface with a garden hose.

12. -A spraying apparatus according to claim 4, further comprising:
    a flow rate valve interfaced in fluidic communication between the one or more spray heads and the liquid tank; and
    a flow rate control communicatively coupled to the flow rate valve and configured to control a flow rate of liquid from the liquid tank to the one or more spray heads based at least on input received from an operator of the spraying apparatus.

13. A spraying apparatus according to claim 1, further comprising a windskirt coupled to the hood and oriented in a substantially vertical position extending from a bottom edge of the hood to substantially even with the surface while the hood is in the closed position.

14. A spraying apparatus according to claim 13, wherein the windskirt comprises rubber or plastic.

15. A spraying apparatus for applying liquid to a surface, comprising:
    a frame;
    a dome-shaped hood, comprising:
    a first portion supported by the frame in a closed position and directly coupled to the frame via a first hinge having a first substantially horizontal geometric axis, the first portion having a top side facing generally upwards and an underside facing generally downwards while the first portion is in the closed position, the first portion movable relative to the frame from the closed position substantially parallel to a surface to an open position about the first substantially horizontal geometric axis;
    at least one second portion coupled to the first portion via a second hinge having a second substantially horizontal geometric axis substantially perpendicular to the first substantially horizontal geometric axis while the first portion is in the closed position, the at least one second portion movable from a first position substantially parallel to the first portion to a second position about the second substantially horizontal geometric axis; and
    one or more holes configured to allow passage of at least one fluid conduit through the hood; and
    one or more spray heads, each spray head coupled to the underside of the hood substantially proximate to a respective one of the one or more holes and configured to spray a liquid on the surface, the one or more spray heads and the dome-shaped hood configured such that the dome-shaped hood provides a wind barrier for the liquid sprayed from the one or more spray heads; and
    a liquid tank fluidicly coupled to the one or more spray heads via the at least one fluid conduit and configured to hold the liquid.

16. A spraying apparatus according to claim 15, the one or more spray heads including one or more control droplet applicators (CDAs).

17. A spraying apparatus according to claim 15, further comprising an agitator pump configured to mix the liquid and a substance together.

18. A spraying apparatus according to claim 17, wherein the substance is selected from the group consisting of a biocide, a fertilizer, a plant growth regulator, a biostimulant, turf paint, a herbicide, an insecticide, and a dye.

19. A spraying apparatus according to claim 17, wherein the substance is a solid, and the agitator pump is configured to dissolve the solid into the liquid.

20. A spraying apparatus for applying liquid to a surface, comprising:

a frame;

a hood, comprising:

a first portion supported by the frame in a first portion first position and directly coupled to the frame via a first hinge having a first substantially horizontal axis, the first portion having an upper side facing generally upwards and an underside facing generally downwards while the first portion is in the first portion first position, the first portion movable relative to the frame about the first substantially horizontal axis from the first portion first position substantially parallel to the surface to a first portion second position;

at least one second portion coupled to the first portion via a second hinge having a second substantially horizontal axis disposed at an angle to the first substantially horizontal axis while the first portion is in the first portion first position, the at least one second portion movable about the second substantially horizontal axis from a second portion first position in substantially planar alignment to the first portion to a second portion second position; and one or more spray heads, each spray head coupled to the underside of the hood and configured to spray a liquid on the surface, the one or more spray heads and the hood configured such that the hood provides a wind barrier for the liquid sprayed from the one or more spray heads.

21. A spraying apparatus according to claim 20, the one or more spray heads including one or more control droplet applicators (CDAs).

22. A spraying apparatus according to claim 20, further comprising an agitator pump configured to mix the liquid and a substance together.

23. A spraying apparatus according to claim 22, wherein the substance is selected from the group consisting of a biocide, a fertilizer, a plant growth regulator, a biostimulant, turf paint, a herbicide, an insecticide, and a dye.

24. A spraying apparatus according to claim 23, wherein the substance is a solid, and the agitator pump is configured to dissolve the solid into the liquid.

25. A spraying apparatus according to claim 20, wherein the angle is about 90 degrees.

26. A spraying apparatus for applying liquid to a surface, comprising:

a frame;

a hood, comprising:

a first portion supported by the frame in a first position and directly coupled to the frame via a first hinge having a first axis, the first portion having a first side facing generally away from the surface and a second side facing generally toward the surface while the first portion is in the first position, the first portion pivotable relative to the frame about the first axis from the first position substantially parallel to the surface to a second position;

at least one second portion pivotally coupled to the first portion via a second hinge having a second axis substantially non-parallel to the first axis while the first portion is in the first position; and one or more spray heads, each spray head coupled to the underside of the hood and configured to spray a liquid on the surface.

27. A spraying apparatus according to claim 26, the one or more spray heads including one or more control droplet applicators (CDAs).

28. A spraying apparatus according to claim 26, further comprising an agitator pump configured to mix the liquid and a substance together.

29. A spraying apparatus according to claim 28, wherein the substance is selected from the group consisting of a biocide, a fertilizer, a plant growth regulator, a biostimulant, turf paint, a herbicide, an insecticide, and a dye.

30. A spraying apparatus according to claim 29, wherein the substance is a solid, and the agitator pump is configured to dissolve the solid into the liquid.

* * * * *